US007658331B1

(12) United States Patent
Barron

(10) Patent No.: US 7,658,331 B1
(45) Date of Patent: Feb. 9, 2010

(54) CHECKOUT DEVICE WITH HAND GRIP

(75) Inventor: Peter B. Barron, Tucker, GA (US)

(73) Assignee: NCR Corporation, Dayton, OH (US)

( * ) Notice: Subject to any disclaimer, the term of this patent is extended or adjusted under 35 U.S.C. 154(b) by 631 days.

(21) Appl. No.: 11/424,360

(22) Filed: Jun. 15, 2006

(51) Int. Cl.
*G06K 9/36* (2006.01)

(52) U.S. Cl. .............................. 235/462.1; 235/462.01; 235/462.09

(58) Field of Classification Search .............. 235/462.1, 235/462.36, 462.43, 462.14, 462.47, 462.09, 235/462.01
See application file for complete search history.

(56) References Cited

U.S. PATENT DOCUMENTS 6,974,084 B2 * 12/2005 Bobba et al. ........... 235/462.39
2002/0139856 A1 * 10/2002 Barkan .................... 235/462.4
2005/0104927 A1 * 5/2005 Kudoh et al. .................. 347/37

* cited by examiner

*Primary Examiner*—Edwyn Labaze
(74) *Attorney, Agent, or Firm*—Paul W. Martin

(57) ABSTRACT

A checkout device which can be gripped for carrying, installation, and removal. The checkout device includes a generally L-shaped housing including a first housing portion suited to placement within a checkout counter, and a second housing portion mounted above the first housing portion and suited to extending above the checkout counter. The first and second housing portions include a barcode reader for sending scanning light beams from a first aperture in the first housing portion and a second aperture in the second housing portion to form a multi-line scan pattern. The second housing portion has a rear surface including a hand grip.

18 Claims, 5 Drawing Sheets

CHECKOUT DEVICE WITH HAND GRIP

BACKGROUND OF THE INVENTION

The present invention relates to a checkout device and more specifically to a checkout device with a hand grip.

Large barcode scanners, such as multi-aperture barcode reader, may be heavy and awkward to carry, install, or remove.

Therefore, it would be desirable to provide a checkout device with a hand grip.

SUMMARY OF THE INVENTION

A checkout device with a hand grip is provided.

The checkout device includes a generally L-shaped housing including a first housing portion suited to placement within a checkout counter, and a second housing portion mounted above the first housing portion and suited to extending above the checkout counter. The first and second housing portions include a barcode reader for sending scanning light beams from a first aperture in the first housing portion and a second aperture in the second housing portion to form a multi-line scan pattern. The second housing portion has a rear surface including a hand grip.

DETAILED DESCRIPTION

Figure 1:
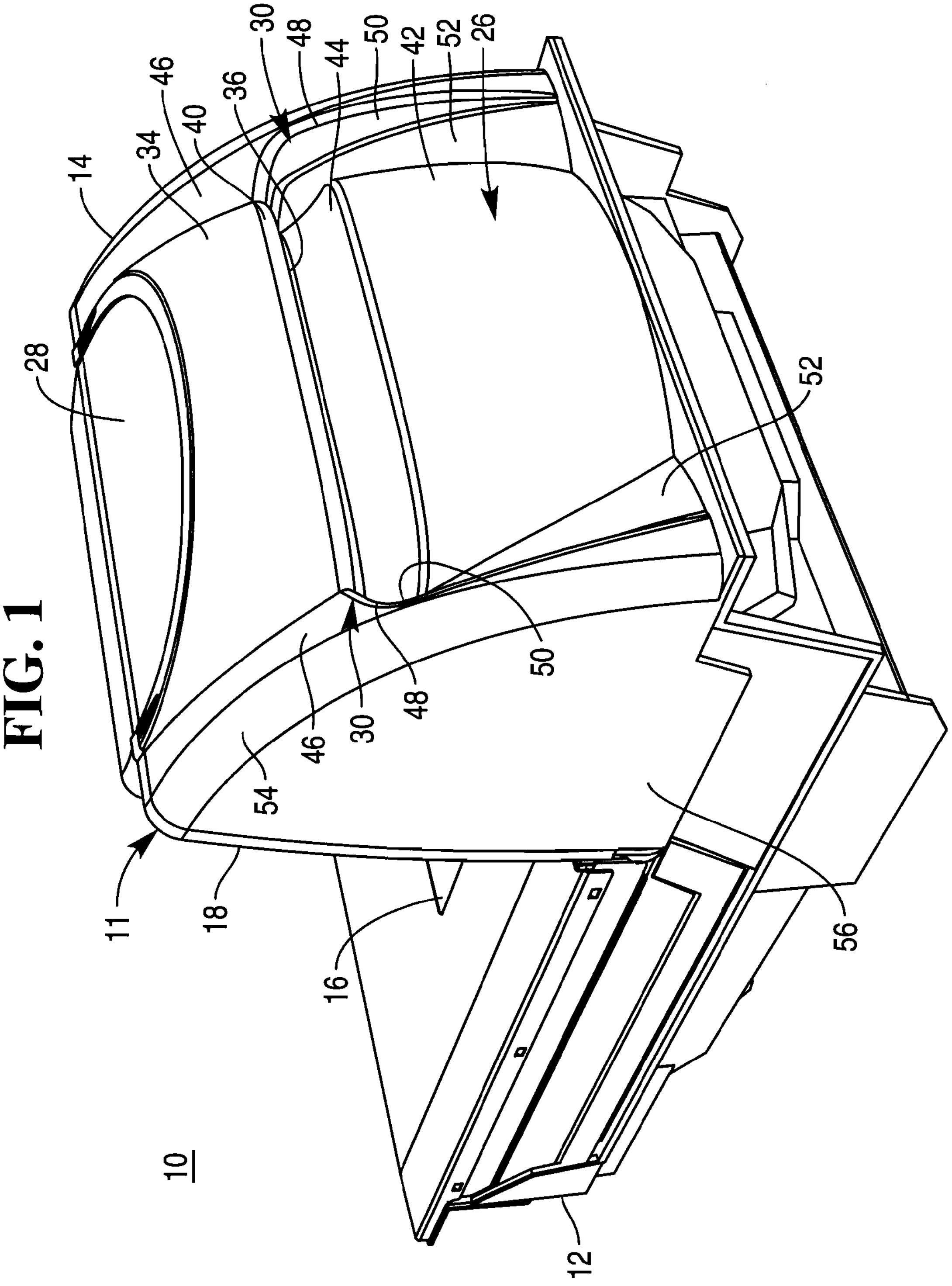
FIG. 1 is a perspective view of a checkout device.

With reference to FIG. 1, an example embodiment of a checkout device 10 includes a multi-aperture barcode scanner. Checkout device 10 may include other integrated peripherals, including a scale, a radio frequency identification (RFID) tag reader, or an electronic article surveillance (EAS) tag sense and deactivation system.

Checkout device 10 includes a housing 11 including a first housing portion 12 and a second housing portion 14, arranged in a generally L-shaped fashion. First housing portion 12 includes scanning components for sending scanning light beams through aperture 16 for scanning a barcode on an item. First portion is generally recessed within checkout counter 20 when installed such that aperture 16 is generally flush with top surface 22.

Second housing portion 14 extends above top surface 22 and sends scanning light beams through aperture 18 towards the item. Scanning light beams from first housing portion 12 and second housing portion 14 form a multi-line scan patter and facilitate scanning of multiple sides of the item.

Second housing portion 14 has a curved rear surface 26. Surface portion 28 is flat and may be used to mount a keyboard or other peripheral.

To assist with gripping checkout device 10, for example, for carrying checkout device 10 or for installing or removing checkout device 10 from checkout counter 20, second housing portion 14 includes hand grip 30. Hand grip 30 may be formed as part of the fabrication of housing portion 14. Hand grip 30 may alternatively be fastened or mounted to housing portion 14.

Figure 2:
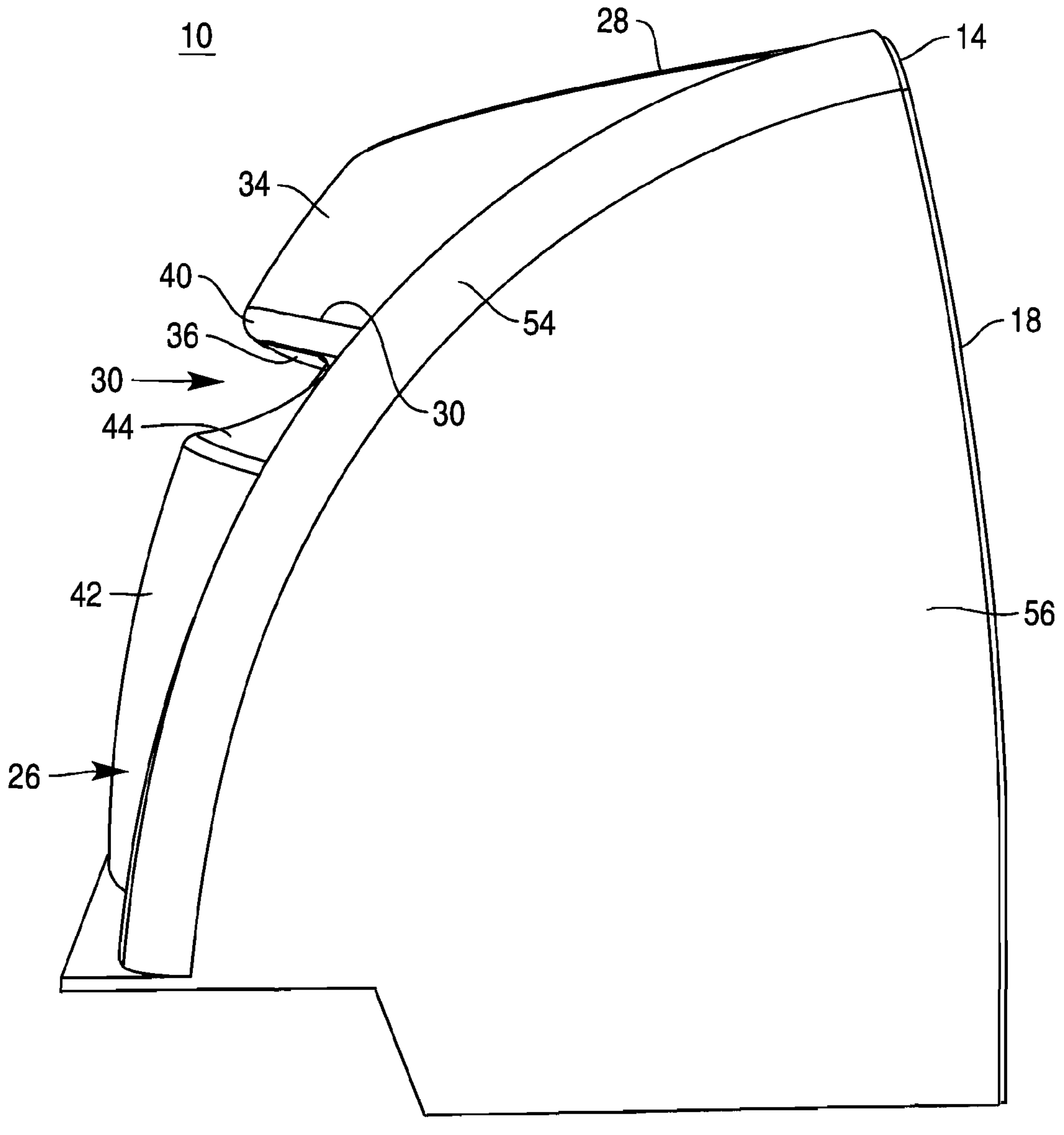
FIG. 2 is a first view of a tower portion of the checkout device.
Figure 3:
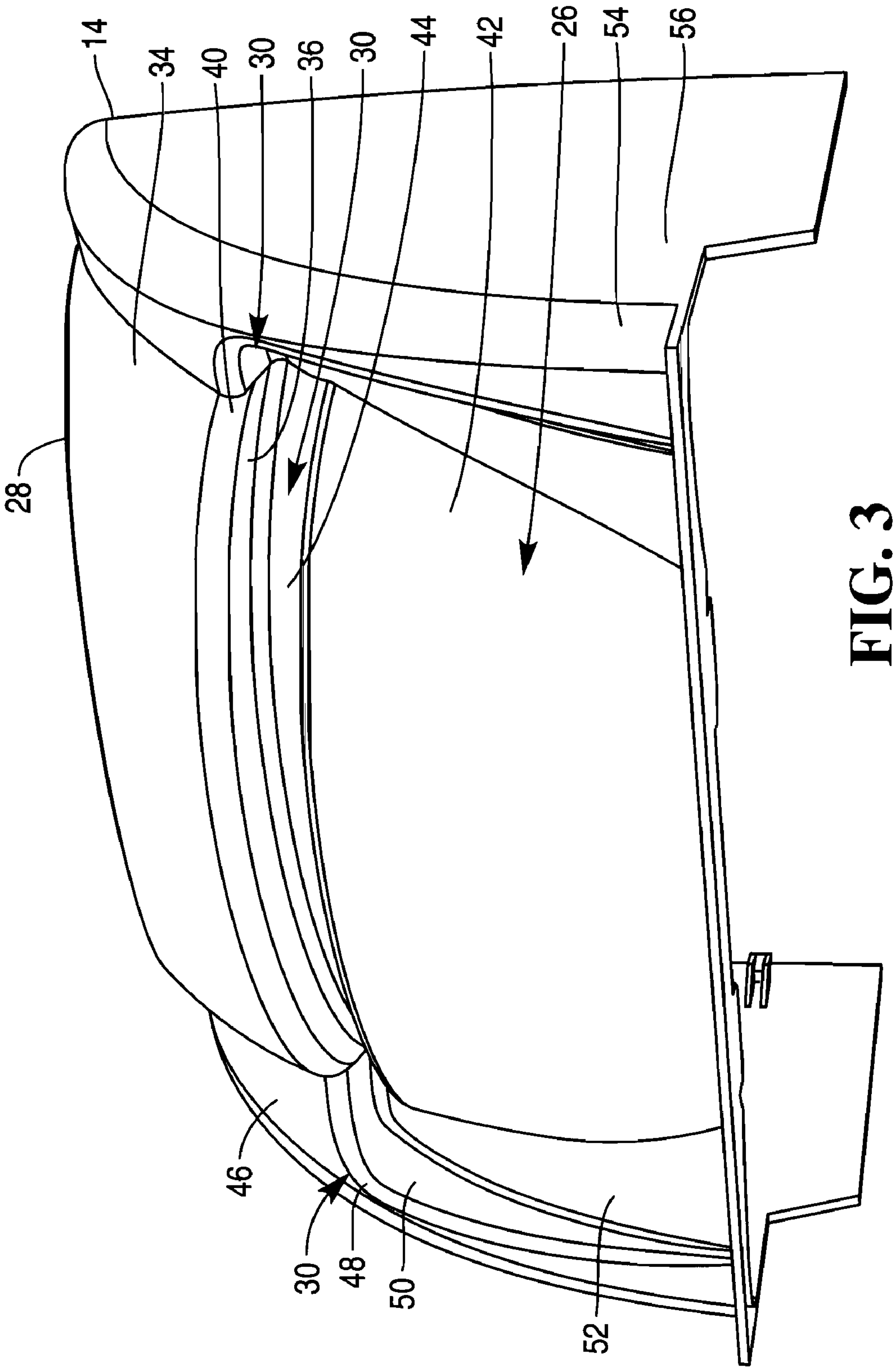
FIG. 3 is a second view of the tower portion of the checkout device.

With reference to FIGS. 1-3, example hand grips 30 are illustrated in more detail. These examples are an integral part of second housing portion 14.

A first example hand grip 30 is located on rear surface 26, approximately half way up, although, it may be located higher or lower on rear surface 26.

Surface portion 36 is recessed with respect to surface portion 34. Surface portions 34 and 36 join at a curved edge transition surface 40. Surface portion 36 may be cupped in a shape similar to the rounded shape of finger tips. Surface portion 44 tapers from surface portion 42 to meet the inside edge of surface portion 36.

Example hand grip 30 extends across substantially the entire width of second housing portion 14. Another example of hand grip 30 may be smaller in width and be centrally located.

A second example hand grip 30 may provide gripping from the sides of housing portion 14, especially useful if a peripheral, such as a keyboard, is mounted on top of housing portion 14.

Surface portions 46 include edges 48. Edges 48 join surface portions 46 with recessed surface portions 50 to form gripping surfaces on both sides of housing portion 14. Edges 48 are curved to provide an upward limit of travel for gripping hands.

When the first and second example hand grips 30 are both incorporated into housing portion 14, edges 48 may join edge 40 at its ends, allowing the hands to overlap both types of hand grips 30. Side surfaces 54 and 56 further support the hands.

The angular differences between surface portions 34 and 36, and between surface portions 46 and 50, are sufficient for gripping without sacrificing hand comfort. The angular difference may be up to about ninety degrees. An example range is between about 87°-90°.

Figure 4:
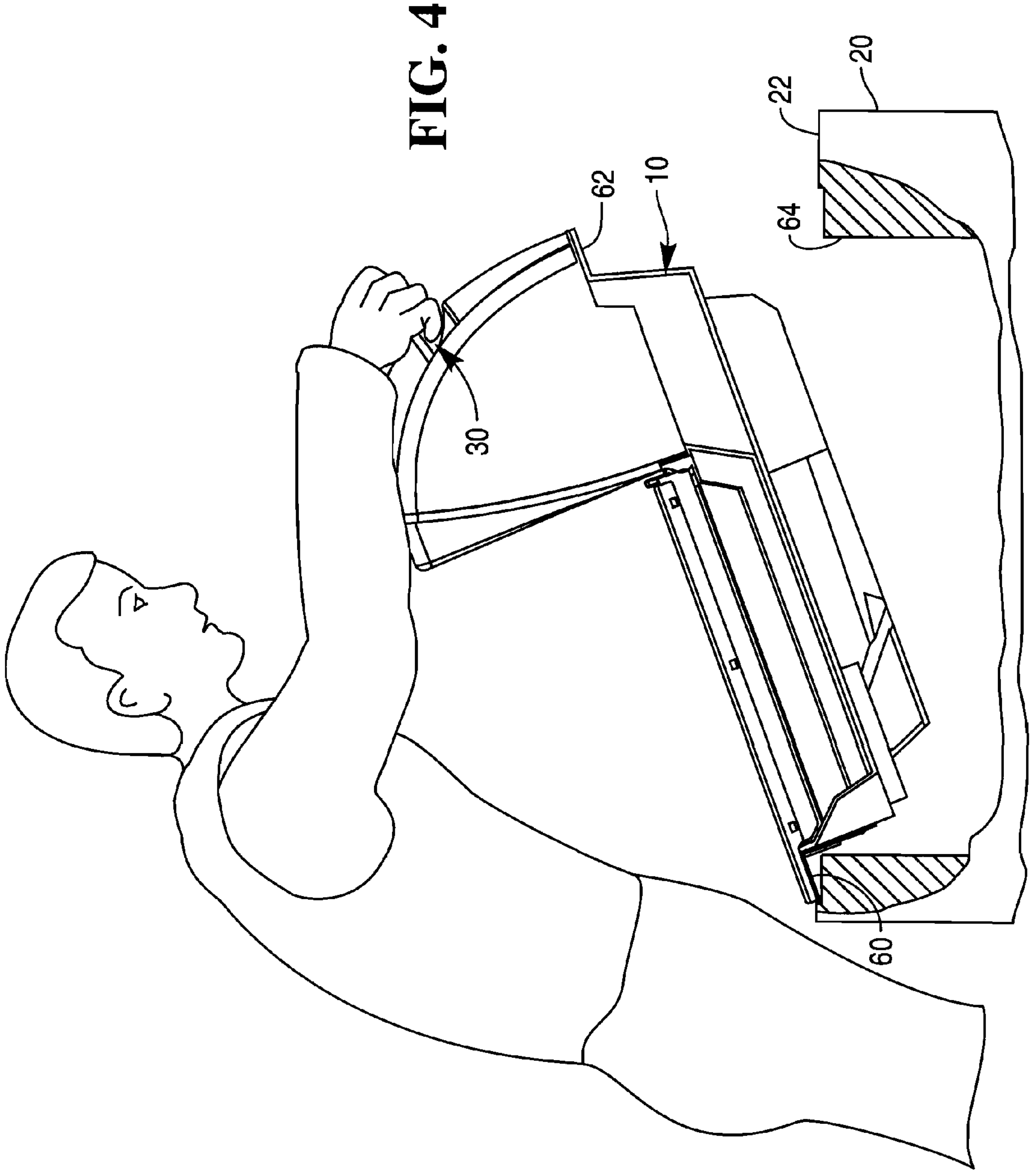
FIG. 4 is a view illustrating gripping of the checkout device.

With reference to FIG. 4, operation of the first example of hand grip 30 is illustrated. A person carrying, installing, or removing checkout device 10 places a palm of one hand on surface 34 and wraps the fingers around edge 40 and onto surface 36. The person may then maintain a safe grip on checkout device 10. Lip 60 is oriented on top surface 22 of checkout counter 20 when inserting or removing checkout device 10 from aperture 54. Bottom surface 62 rests on checkout counter 10 when checkout device 10 is full installed within aperture 64.

Figure 5:
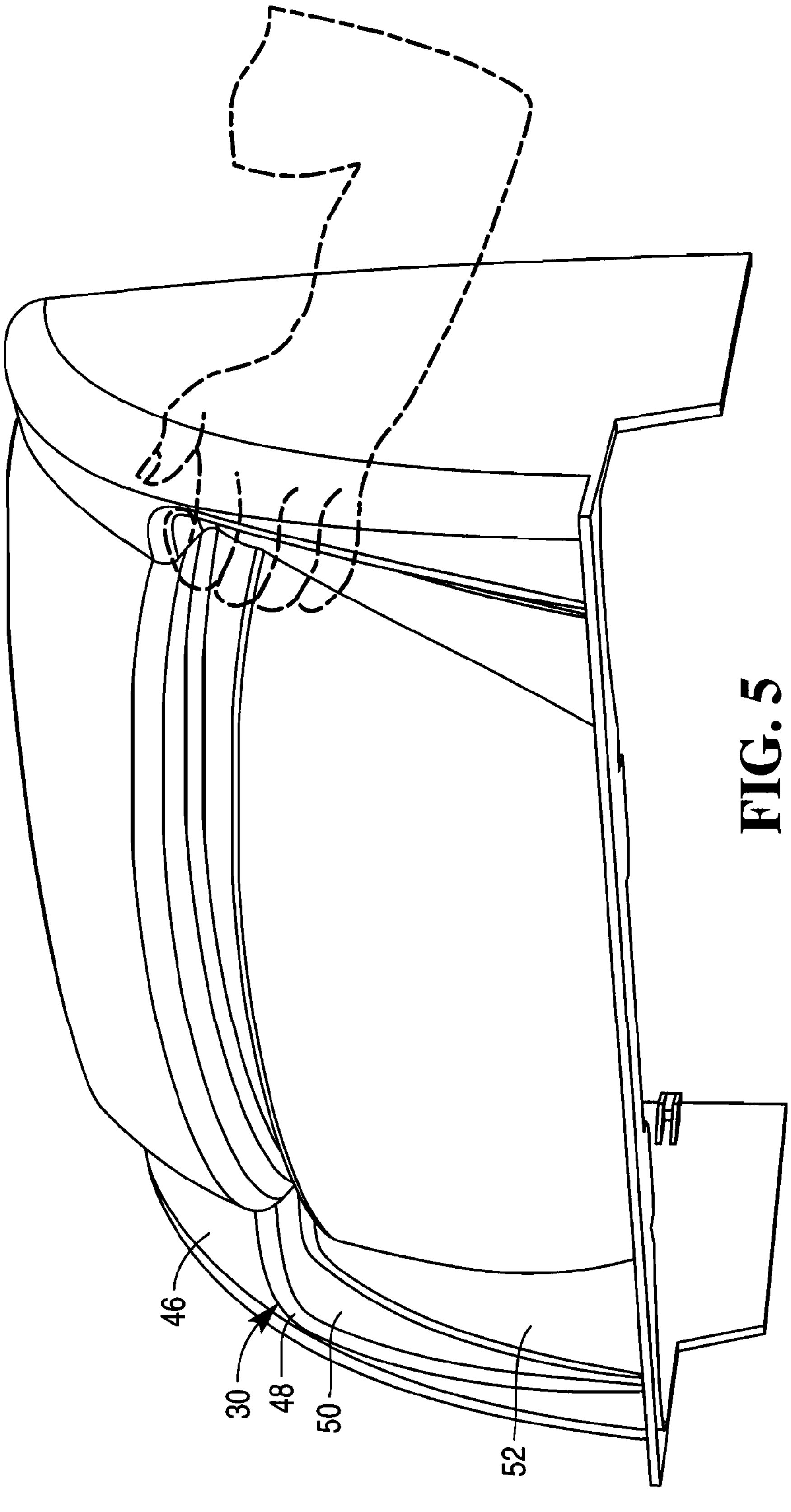
FIG. 5 is another view illustrating gripping of the checkout device.

With reference to FIG. 5, operation of the second example of hand grip 30 is illustrated. A person carrying, installing, or removing checkout device 10 places one or more palms of one or more hands on surfaces 56 and wraps the fingers around surfaces 54 and edges 48 and onto surfaces 50. The person may then maintain a safe grip on checkout device 10. Surfaces 52 provide a guide for the fingers if they are placed to low. The person may then follow surfaces 52 upwards to edges 48.

Although particular reference has been made to certain embodiments, variations and modifications are also envisioned within the spirit and scope of the following claims.

The invention claimed is:

1. A checkout device comprising:

a generally L-shaped housing including a first housing portion suited to placement within a checkout counter; and a second housing portion mounted above the first housing portion and suited to extending above the checkout counter;

wherein the first and second housing portions include a barcode reader for sending scanning light beams from a first aperture in the first housing portion and a second aperture in the second housing portion to form a multi-line scan pattern;

wherein the second housing portion has a rear surface including an upper surface portion with a lower edge, a lower surface portion with an upper edge, and a hand grip including a first surface recessed from the lower edge into the second housing portion and including an inner edge and a second surface extending between the inner edge of the first surface and the upper edge of the lower surface portion.

2. The checkout device of claim 1, wherein the first surface is arranged generally horizontally across a part of the rear surface.

3. The checkout device of claim 2, wherein the first surface is located about half way up the rear surface.

4. The checkout device of claim 2, wherein the first surface extends across substantially all of the rear surface.

5. The checkout device of claim 2, wherein the first surface extends only partially across the rear surface and is centrally located.

6. The checkout device of claim 1, wherein the first surface is recessed at an acute angle from the upper surface portion.

7. The checkout device of claim 1, wherein the first surface is cupped to a shape of finger tips.

8. The checkout device of claim 1, wherein the rear surface includes left and right sides and wherein the hand grip further includes:

a third surface recessed and arranged generally vertically along the left side of the rear surface and a fourth surface recessed and arranged generally vertically along the right side of the rear surface.

9. The checkout device of claim 8, wherein the third and fourth surfaces are arranged at an acute angle to the rear surface.

10. A checkout device comprising:

a generally L-shaped housing including a first housing portion suited to placement within a checkout counter; and a second housing portion mounted above the first housing portion and suited to extending above the checkout counter;

wherein the first and second housing portions include a barcode reader for sending scanning light beams from a first aperture in the first housing portion and a second aperture in the second housing portion to form a multi-line scan pattern;

wherein the second housing portion has a rear surface with hand grips for gripping the rear surface from above the second housing portion, from a right side of the second housing portion, or from a left side of the second housing portion;

wherein the rear surface includes an upper surface portion with a lower edge and a lower surface portion with an upper edge, and wherein a first hand grip includes a first surface recessed from the lower edge into the second housing portion at a first acute angle from the upper surface portion and including an inner edge, and a second surface extending between the inner edge of the first surface and the upper edge of the lower surface portion.

11. The checkout device of claim 10, wherein the first hand grip is arranged generally horizontally across a part of the rear surface.

12. The checkout device of claim 10, wherein a second hand grip is arranged generally vertically along a left side of the rear surface and a third hand grip is arranged generally vertically along a right side of the rear surface.

13. The checkout device of claim 10, wherein the rear surface includes left and right sides having left and right edges that extend from first and second ends of the lower edge of the upper surface portion, respectively, wherein a second hand includes a third surface recessed at a second acute angle to the upper surface portion, and wherein a third hand grip includes a fourth surface recessed at a third acute angle to the upper surface portion.

14. The checkout device of claim 13, wherein the left and right edges are J-shaped, having curved portions that join the first and second ends of the lower edge of the upper surface portion.

15. The checkout device of claim 14, wherein the curved portions limit upward hand movement.

16. A checkout device comprising:

a generally L-shaped housing including a first housing portion suited to placement within a checkout counter; and a second housing portion mounted above the first housing portion and suited to extending above the checkout counter;

wherein the first and second housing portions include a barcode reader for sending scanning light beams from a first aperture in the first housing portion and a second aperture in the second housing portion to form a multi-line scan pattern;

wherein the second housing portion has a rear surface with hand grips for gripping the rear surface from above the second housing portion, from a right side of the second housing portion, or from a left side of the second housing portion; and wherein the rear surface includes left and right sides having left and right edges that extend from first and second ends of the lower edge of the upper surface portion, respectively, wherein a first hand grip includes a first surface recessed at a first acute angle to the upper surface portion, and wherein a second hand grip includes a second surface recessed at a second acute angle to the upper surface portion.

17. The checkout device of claim 16, wherein the left and right edges are J-shaped, having curved portions that join the first and second ends of the lower edge of the upper surface portion.

18. The checkout device of claim 17, wherein the curved portions limit upward hand movement.

* * * * *